United States Patent [19]

Noda

[11] Patent Number: 4,695,692
[45] Date of Patent: Sep. 22, 1987

[54] SWITCH WITH PIVOTING CLIP-TYPE CONTACTS

[75] Inventor: Yasuhiko Noda, Furukawa, Japan
[73] Assignee: Alps Electric Co., Ltd., Japan
[21] Appl. No.: 809,056
[22] Filed: Dec. 13, 1985

[30] Foreign Application Priority Data

Dec. 13, 1984 [JP] Japan .............................. 59-189113[U]

[51] Int. Cl.⁴ ............................................ H01H 21/62
[52] U.S. Cl. ................................. 200/335; 200/6 BA; 200/254; 200/67 B
[58] Field of Search ............... 200/254, 255, 252, 335, 200/67 B, 16 F, 282, 162, 6 BA, 15; 179/159, 164

[56] References Cited

U.S. PATENT DOCUMENTS 2,233,336 2/1941 Bentley .............................. 200/67 B
2,891,119 6/1959 Meola ................................. 200/67 B
3,407,276 10/1968 Pescetto ............................. 200/67 B
3,947,391 3/1976 Lutzenberger ..................... 200/16 F Primary Examiner—Stephen Marcus
Assistant Examiner—Renee S. Luebke
Attorney, Agent, or Firm—Guy W. Shoup

[57] ABSTRACT

A switch is provided with a normally-open terminal and a normally-closed terminal arranged on the same place with a relatively wide gap formed therebetween. A pivot member pivoted to the switch casing carries a clip-like movable terminal one end of which clamps and engages with a supporting hole bored in a common terminal, and the second end of which clamps and slidingly engages the normally-open and normally-closed terminals.

The normally-closed terminal has a guide post for maintaining expansion of and guiding the second end of the movable terminal as it traverses the gap between the normally-open and normally-closed terminals so that smooth switching operation is obtained.

4 Claims, 3 Drawing Figures

SWITCH WITH PIVOTING CLIP-TYPE CONTACTS

BACKGROUND OF THE INVENTION

1. Field of the Invention

This invention relates to a switch and, more particularly, to a hook switch used widely in a telephone set.

2. Description of the Prior Art

The hook switch of the prior art utilized the so-called leaf switch and the reliability of its contact action was poor. In case a slide contact structure is used in order to enhance contact reliability, a clip-like movable terminal is held by a slide member which is caused to slide by a control lever, and this movable terminal has a movable contact which slidingly engages a fixed contact. The conventional switch has a narrow gap between the terminals, and causes wearing of the terminals because the movable contact moving together with the slide member clamps shut against the fixed terminal and is therefore poor in reliability. Further, because the contact formed on the movable terminal is forced to frictionally slide on the contact of the fixed terminal from its clamped state, the conventional switch requires a large operating force to overcome the clamping force of the terminal and the lifetime is short due to the presence of powder and the like resulting from wearing of the terminals and accumulating in between the fixed terminals.

SUMMARY OF THE INVENTION

It is the object of the present invention to solve the foregoing problems of the prior art and to provide a hook switch which has an improved reliability, needs only a small working force and possesses a long lifetime.

In brief, a switch according to the present invention comprises a common terminal, a normally-open terminal and a normally-closed terminal arranged on the same plane with a relatively wide gap formed between the latter two so that debris will not accumulate therebetween, a clip-like movable terminal one end of which clamps and engages with a supporting hole bored in the common terminal, and the second end of which clamps and engages slidingly with either the normally-closed terminal or normally-open terminal when operated, the second end having projected segments engaging with a guide post which expands and guides the second end as it traverses the gap between the normally open and normally closed terminals.

DETAILED DESCRIPTION OF THE PREFERRED EMBODIMENT

An embodiment of the present invention will now be described with reference to the drawings.

Figure 1:
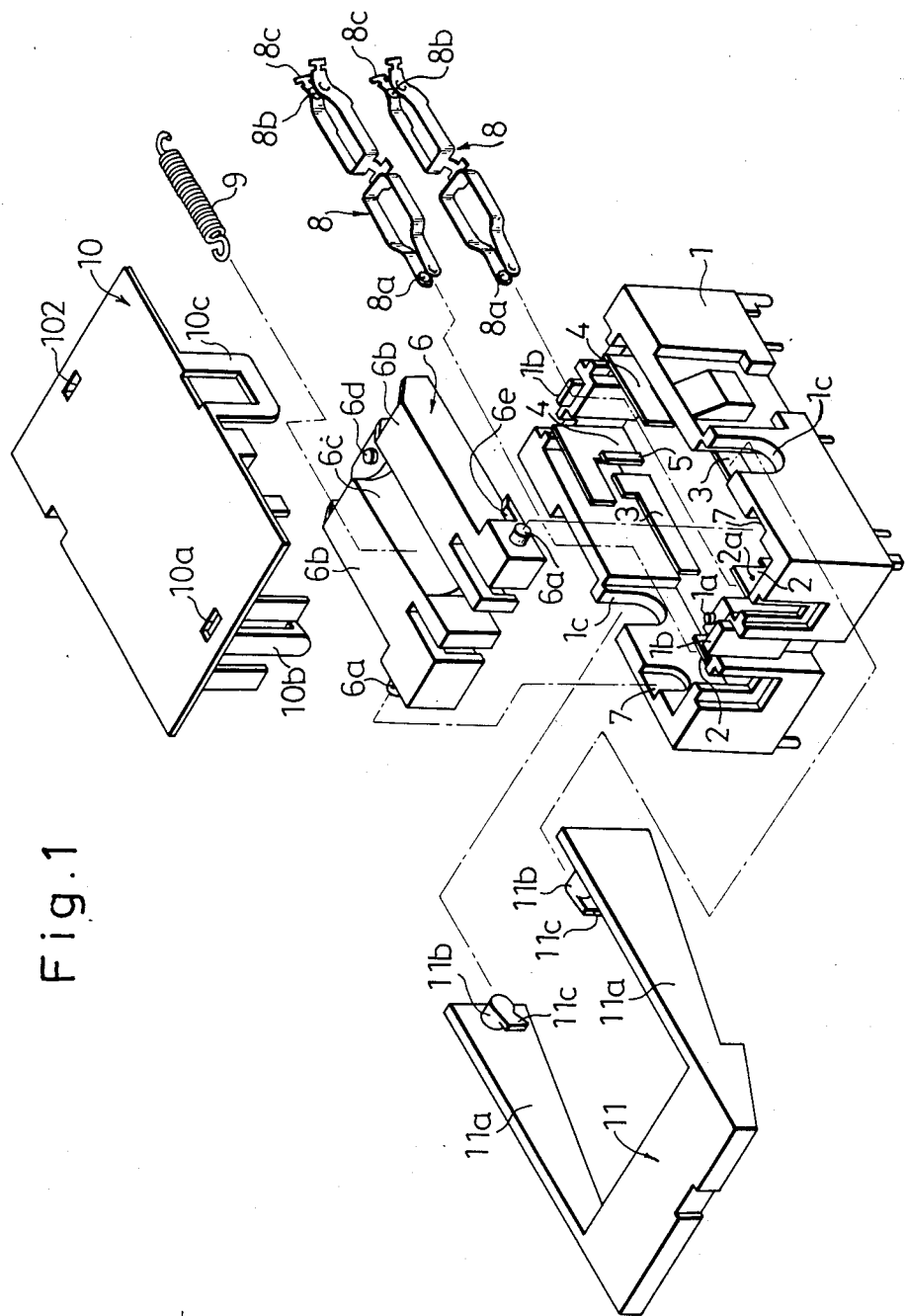
FIG. 1 is an exploded perspective view of a hook switch according to the present invention.
Figure 2:
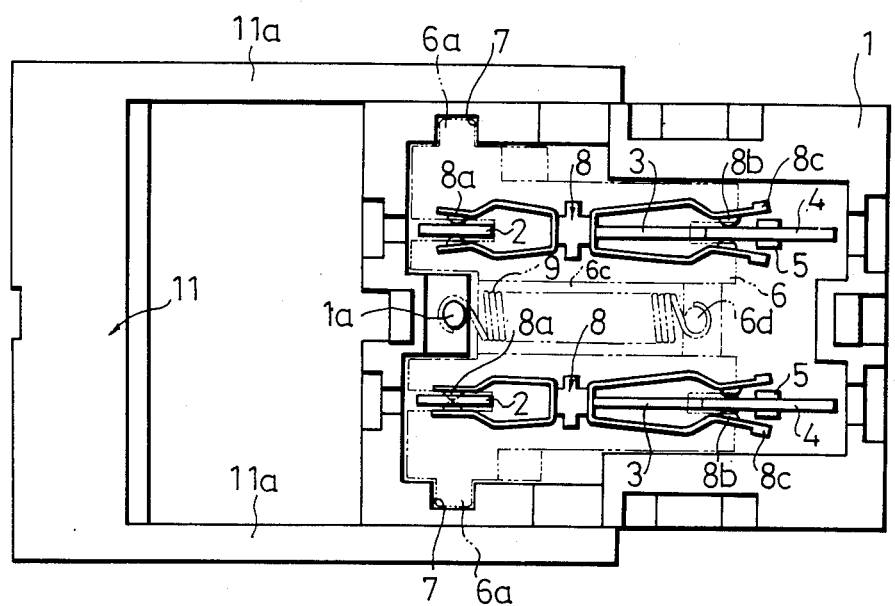
FIG. 2 is a plan view of the hook switch with a cover removed.
Figure 3:
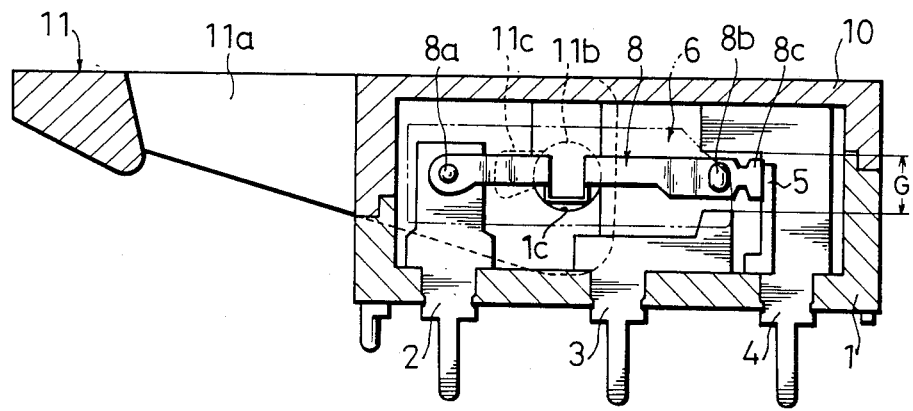
FIG. 3 is a cross sectional view of the switch.

In the drawings, reference numeral 1 indicates a box-shaped casing with an upper side opened. On the bottom of the casing is a pair of common terminals 2, 2, normally-open terminals 3, 3, and normally-closed terminals 4, 4 with their lower ends projecting out of the casing. The common terminal 2, normally-open terminal 3 and normally-closed terminal 4 of each switch are arranged on the same vertical plane, and the contact surface of the normally-closed terminal 4 is positioned above the contact surface of the corresponding normally-open terminal 3 with a relatively wide gap G (see FIG. 3) left therebetween. A guide post 5 is provided on a marginal portion of the normally-closed terminal 4 on the side of the normally-open terminal 3. The guide post 5 is made of insulating material such as synthetic resin and serves to expand and guide the point of a clip-like movable terminal described hereinafter.

Inside the casing 1 a pivot member 6 is accommodated pivotably and has projections 6a, 6a formed on its rear side portion which are supported pivotably by U-shaped receiving portions 7, 7 formed in inner portions of side walls of the casing 1. The pivot member 6 is formed with movable terminal-holding sections 6b, 6b with their lower sides opened, along its longitudinal direction on either side. In each movable terminal-holding section 6b a clip-like movable terminal 8 is received and held thereby.

The clip-like movable terminal 8 has at front and rear ends contacts 8a, 8b, and the contact 8a serving as a base portion clamps and engages with a supporting hole 2a bored in the common terminal 2, so that the movable terminal can pivot about the supporting hole 2a together with the pivot member 6. On the other hand, a further end of the contact 8b has projection segments 8c integral therewith which slide on the guide post 5 provided on the normally-closed terminal 4, such that the switching action of the contact 8b of the movable terminal 8 is guided by the guide post 5.

In the upper surface of the pivot member 6 between the movable terminal-holding sections 6b, 6b a groove portion 6c is formed whose bottom is arc-shaped, in this groove portion 6c a coil spring 9 is accommodated for returning the pivot member 6 to its normal position. One end of the coil spring 9 is clamped to a projection 6d formed on an upper end portion of the pivot member 6 and the other end clamped to a projection 1a provided on the casing 1, so that the pivot member 6 and casing 1 are linked together.

Further, in the drawings, reference numeral 10 indicates a cover for closure of the upper opening of the casing 1, in a hole 10a, bored at an end portion of the cover 10, a projection 1b of the casing 1 is fitted, and the cover 10 is coupled to the casing 1 through elasticity of its material by means of a pawl 10b and a hook 10c.

Reference numeral 11 indicates a control lever which has a pair of arms 11a, 11a each provided integrally at an inner end portion with a pivot projection 11b, this pivot projection 11b being fitted in an U-shaped notch 1c formed in either side surface of the casing 1. The pivot projection 11b has a control piece 11c which comes in engagement with a receiving portion 6e formed on the pivot member 6 and transmits a turning force given to the control lever 11 to the pivot member 6.

In the hook switch according to the present invention having the foregoing structure, as the control lever 11 is actuated downward, the pivot member 6 is turned together with the movable terminal 8, whereby switching between the normally-open terminal 3 and normally-closed terminal 4 is performed.

In the foregoing operation, the contact 8a of the movable terminal 8 clamping and engaging with the supporting hole 2a of the common terminal 2 serves as a turning pivot, a relatively wide gap G is left between the contact portion of the normally-open terminal 3 and the contact portion of the normally-closed terminal 4, and the guide post 5 provided on the normally-closed terminal 4 expands and guides the projection segments 8c of the movable terminal 8; therefore the rear contact 8b of the movable terminal 8 is prevented from closing in the gap G between the respective terminals and a smooth switching action is provided.

As is apparent from the foregoing description, the present invention provides the switch which has a high degree of reliability with respect to switching action and structure, requires only a small force for control; accordingly has a long lifetime.

While the preferred embodiment has been described, variations thereto will occur to those skilled in the art within the scope of the present inventive concepts which are delineated by the following claims.

What is claimed is:

1. A switch having pivoting clip-type movable contacts, comprising:

a casing provided with a common terminal at one end and, at an opposite end of the casing, a normally-open terminal spaced apart by a gap from a normally-closed terminal, said terminals being planar in shape and arranged parallel to each other in one vertical plane;

a pivot member having one end pivotably mounted at said one end of said casing and its other end adapted to be pivotably moved along an arcuate path which includes said normally-closed terminal, said gap, and said normally-open terminal;

clip-type movable contacts having a first pair of clip contacts at a first end and a second pair of clip contacts at a second end remote from said first end, said clip-type movable contacts being held in said pivot member such that said first end thereof is disposed at said one end of said pivot member and said second end is disposed to be pivotably moved with said other end of said pivot member along said arcuate path, said first pair of clip contacts being clampingly engaged in a supporting hole bored in said common terminal so as to be in electrical contact with said common terminal and pivotally supported thereby, and said second pair of clip contacts being clampingly engageable with said normally-closed and said normally-open terminals;

a returning spring connected between said pivot member and said casing for biasing said pivot member to a return position; and a lever pivotally mounted at one end to said casing and having a control piece which engages a portion of said pivot member so as to pivot said pivot member and move said second pair of clip contacts between said normally-closed and said normally-open terminals, said lever having an operating portion at its other end remote from said one end thereof and extending from said casing for operating the movement of said second pair of contacts between said terminals.

2. A switch as set forth in claim 1, wherein said normally-closed terminal has an insulating guide post for expanding and guiding the second end of said movable contacts when the second pair of clip contacts traverses the gap between the normally-open and normally-closed terminals.

3. A switch as set forth in claim 1, wherein a contact surface of said normally-closed terminal is positioned above a contact surface of said normally-open terminal.

4. A switch as set forth in claim 1, including further a cover fitted elastically on an upper side opening of said casing.

* * * * *